Sept. 11, 1934.   H. L. BERNARDE   1,973,279
ELECTRICAL MEASURING AND REGULATING SYSTEM Original Filed July 1, 1932   3 Sheets-Sheet 1

WITNESSES:
C. J. Weller.
F. J. Hicks

INVENTOR
Henry L. Bernarde.
BY
ATTORNEY

Sept. 11, 1934.   H. L. BERNARDE   1,973,279
ELECTRICAL MEASURING AND REGULATING SYSTEM
Original Filed July 1, 1932   3 Sheets-Sheet 2

WITNESSES:
C. J. Weller
F. J. Hicks

INVENTOR
Henry L. Bernarde.
BY
ATTORNEY

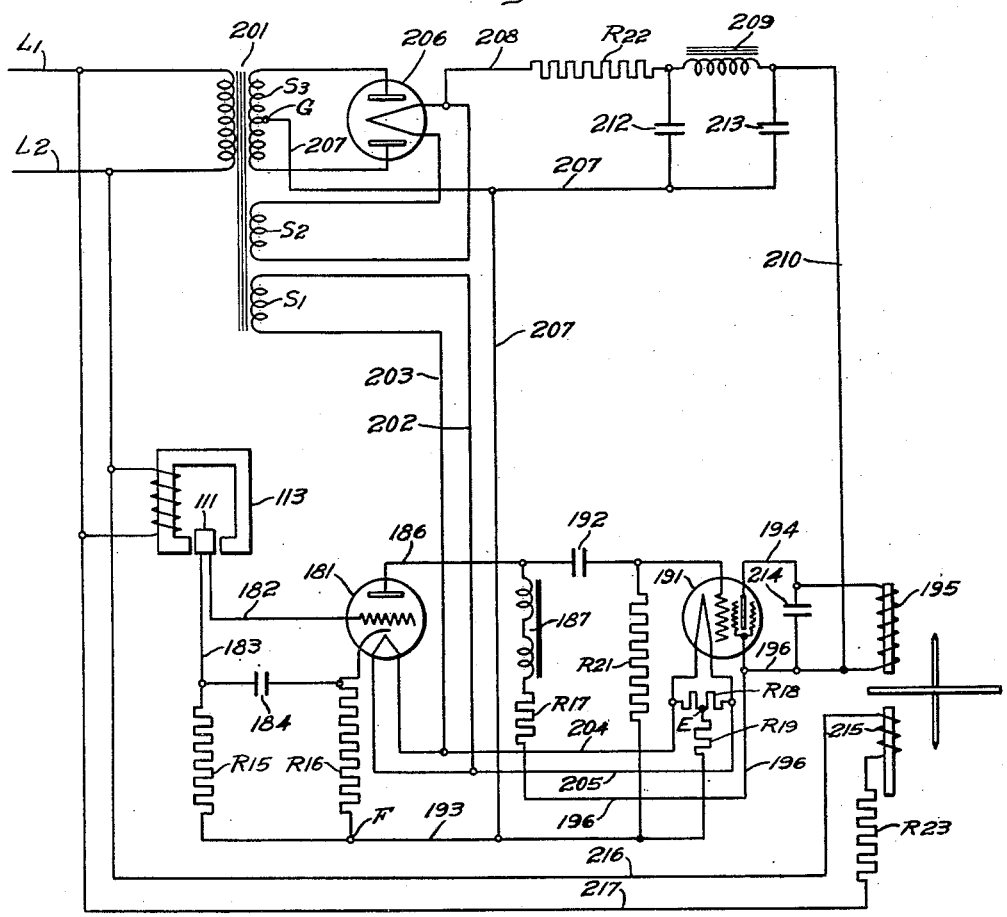

Patented Sept. 11, 1934

1,973,279

UNITED STATES PATENT OFFICE 1,973,279

ELECTRICAL MEASURING AND REGULATING SYSTEM

Henry L. Bernarde, Kearny, N. J., assignor to Westinghouse Electric & Manufacturing Company, East Pittsburgh, Pa., a corporation of Pennsylvania Original application July 1, 1932, Serial No. 620,387. Divided and this application April 22, 1933, Serial No. 667,346

12 Claims. (Cl. 171—95)

REISSUED

My invention relates to electronic recorders or regulators and more specifically to systems wherein a delicate measuring instrument, such as a galvanometer, is arranged to control a comparatively heavy indicating or recording instrument, or a control device such as a valve, switch, or rheostat.

In previous systems of this nature it has been necessary to use a Kelvin balance or other balancing system involving the use of numerous mechanically moving parts and electrical contacts, thereby introducing various complications and errors. Other difficulties experienced with previous systems are slow operation, mechanical friction and the tendency to overrun and hunt.

It is accordingly an object of my invention to provide an accurate recording system which is quick in its action and does not overrun or hunt, and which may be applied to the most sensitive mechanism.

A further object of my invention is to provide a recording system which is small, cheap and simple, and which is not subject to inaccuracies due to mechanical load and friction.

Another object of my invention is to provide an electronic system wherein a feeble alternating voltage derived by the movement of a delicate instrument, such as a galvanometer, is amplified sufficiently to control relatively heavy apparatus.

In accordance with my invention the movement of a galvanometer controls means for deriving from an original alternating voltage a derived alternating voltage variable in phase and amplitude. In order to avoid interference with the delicate rotatable element of the galvanometer, various space effects are utilized for this purpose.

In one embodiment of my invention the voltage deriving means comprises a shutter which is moved by the galvanometer to control the light falling upon a photo-cell from a pair of alternately flashing lamps energized from the original alternating current source on alternate half cycles. The electrical impulses set up by the light flashes on the photo-cell will be in phase with one or the other of the half cycles of the original alternating current depending upon which beam of light is permitted to fall upon the cell, and its magnitude will vary according to the amount of light passed. In another embodiment of my invention a synchronous light-chopper is used with a steady source of light instead of the flashing lamps. Other forms of modulated light sources obviously may be used. Such light controlled systems are fully disclosed in my copending application Serial No. 620,387, filed July 1, 1932 and from which the present application has been divided.

In the embodiment herein disclosed the galvanometer carries a very small pick-up coil which it rotates in an alternating field set up by the original alternating voltage. When the pick-up coil is turned in one direction from its zero position, the alternating voltage induced therein is 180° out of phase with reference to the voltage which would be induced therein if it were turned in the opposite direction from its zero position. Zero position is that position of the pick-up coil where the induced voltage is actually zero.

Although the voltages set up by either voltage deriving means may be very feeble, these voltages may be sufficiently amplified by a suitable amplifier that they may be used for actuating comparatively heavy apparatus.

When the apparatus to be actuated comprises a recording or indicating element it is necessary to provide suitable arresting means for interrupting the motion of the element when it has been moved to a position which corresponds to the condition or quantity which controls the galvanometer. Otherwise the actuated element would continue to move to its extreme position. This is readily accomplished by providing a second pick-up coil on the controlled element. The second coil is connected in series-opposing relation to the first coil, and as it is rotated by the controlled element a position is reached wherein its voltage is exactly equal and opposite to that induced in the first pick-up coil. The voltage of the first pick-up coil being exactly balanced, the controlled element comes to rest and remains stationary until this state of equilibrium is disturbed by another movement of the first coil.

Another arrangement employed for arresting the movement of the controlled element introduces a counter-potential into the measuring circuit to thereby restore the galvanometer to zero. This may be accomplished by a potentiometer, the slide-wire contact of which is connected to the controlled element for movement therewith. A simpler method, avoiding the use of a potentiometer with its sliding contact, consists in passing the controlling current through a resistor in the galvanometer circuit in such a direction that the IR drop opposes the measuring current.

When the controlled element is only moved between two extreme positions as a switch or a valve, it is unnecessary to discontinue the actuating force in any intermediate position and the arresting means referred to above may be omitted, thereby still further simplifying the system.

The invention itself, however, both as to its organization and its method of operation, together with additional objects and advantages thereof, will best be understood from the following description of specific embodiments, when read in connection with the accompanying drawings in which.

Figure 4:
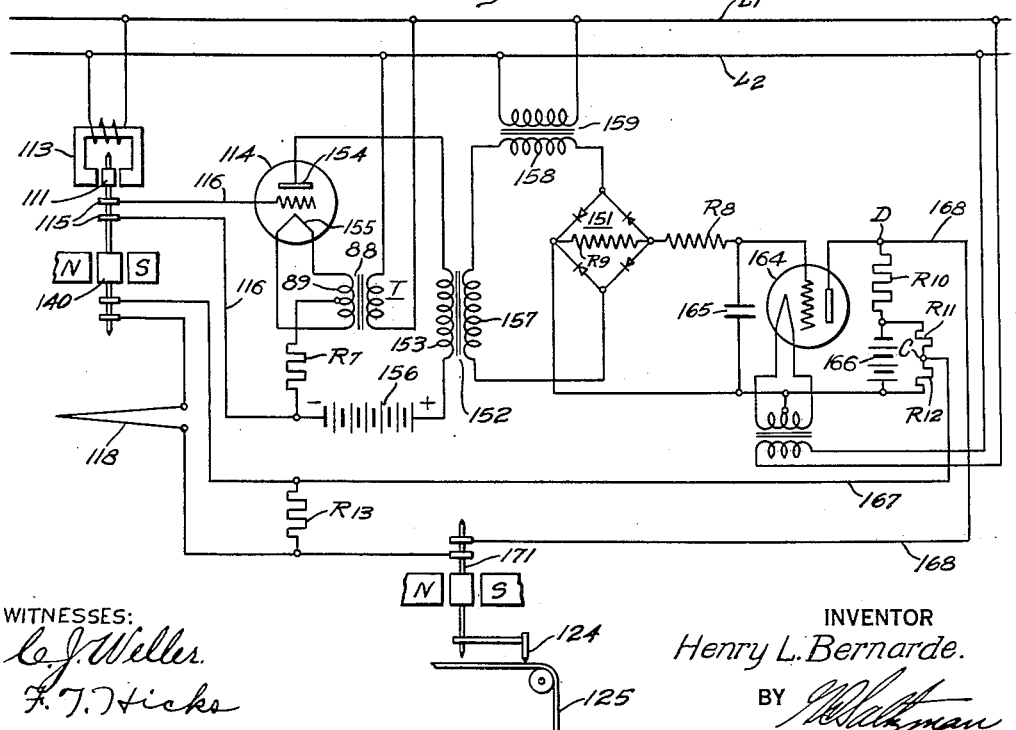

Fig. 4 is a diagrammatic view showing a system provided with a special amplifier for actuating a graphic milliammeter of the D'Arsonval type which is so connected that its controlling current also passes directly through a suitable reristor in the measuring circuit of the galvanometer for balancing it; and Fig. 5 is a diagrammatic view showing an amplifier and source of current suitable for use in such a system.

In the drawings similar reference characters have been applied throughout to similar elements in the various systems and new reference characters have been applied only to new or modified elements.

Figure 1:
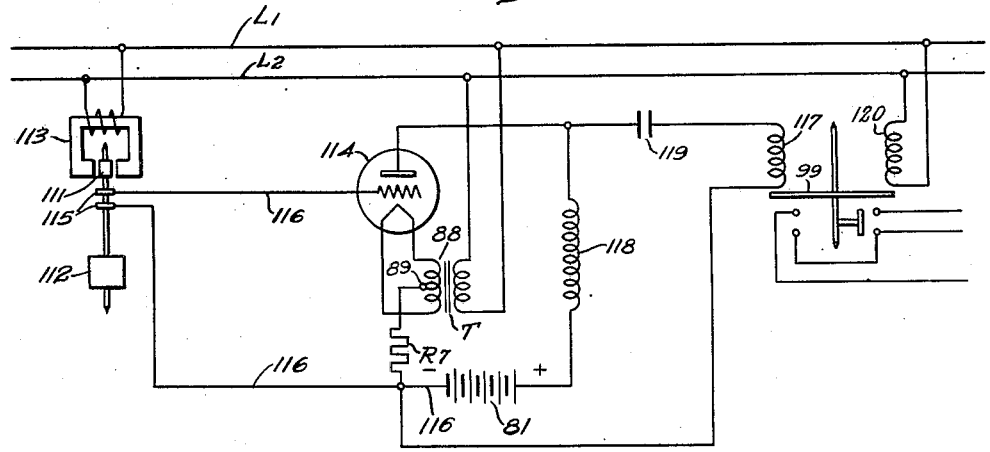
Figure 1 is a diagrammatic view showing a modification wherein the derivation of the additional voltage is accomplished by a small pick-up coil rotated by the galvanometer in an alternating field set up by the original potential.

Referring more specifically to the drawings, the apparatus shown in Fig. 1 comprises a system wherein electromagnetic induction is utilized by mounting a small pick-up coil 111 on the moving element 112 of the galvanometer, voltmeter, pressure meter or any other meter which is responsive to a quantity or condition which is to be controlled. A suitable field structure 113, which is energized from the alternating current line L1 L2, is so positioned relative to the pick-up coil 111 that the latter will be in zero inductive relation thereto when the condition to be maintained is at its correct value.

When the condition varies, the meter 112 rotates the pick-up coil 111 into inductive relation in the field. By connecting the pick-up coil 111 through suitable pig tail or slip ring connections 115 and conductors 116 to the input of a suitable amplifier tube 114 the induced voltages may be amplified without drawing any appreciable current from the coil. It is therefore possible to utilize a very small pick-up coil which does not interfere with the operation of the meter.

The filament of the tube 114 may be energized from the secondary winding 88 of a transformer T having a center tap 89 by which it is connected through a biasing resistor R7 to the conductor 116, and the negative terminal of the plate battery 81.

The output of the amplifier is coupled to one coil 117 of an induction disk motor through any suitable coupling such as impedance coil 118 and condenser 119 whereby the amplified potentials are impressed thereon. A second coil 120 of the induction disk motor is connected directly to the alternating current line, from which it is continuously excited, and when both coils are energized the simultaneous reaction of the two windings creates a torque in the disk 99 thereby causing it to rotate.

The direction of the torque reacting on the disk 99 of the motor depends upon the relative phase relation of the alternating currents traversing the coils, which in turn depends upon the inductive relation of the pick-up coil in its surrounding field. The phase relation of the induced potentials varies 180 degrees depending upon which direction the pick-up coil is turned from its zero inductive position which thereby determines the direction of rotation of the motor. The magnitude of the induced potentials, and hence the speed of the motor, varies according to the amount the pick-up coil is rotated from its zero position. Hence both the direction and the speed of rotation of the motor is controlled by the rotation of the small pick-up coil on the meter, and it may actuate rheostats, valves, relays or other control elements for controlling the condition to be maintained. A commutator type motor may be substituted for the disk induction motor if desired.

When it is desired to utilize the motor for driving a pen or marker to make a record on a chart, it is necessasry to provide some means for arresting the motion of the motor when the movement of the marker has been proportional to the variable condition which initiated the operation.

Figure 2:
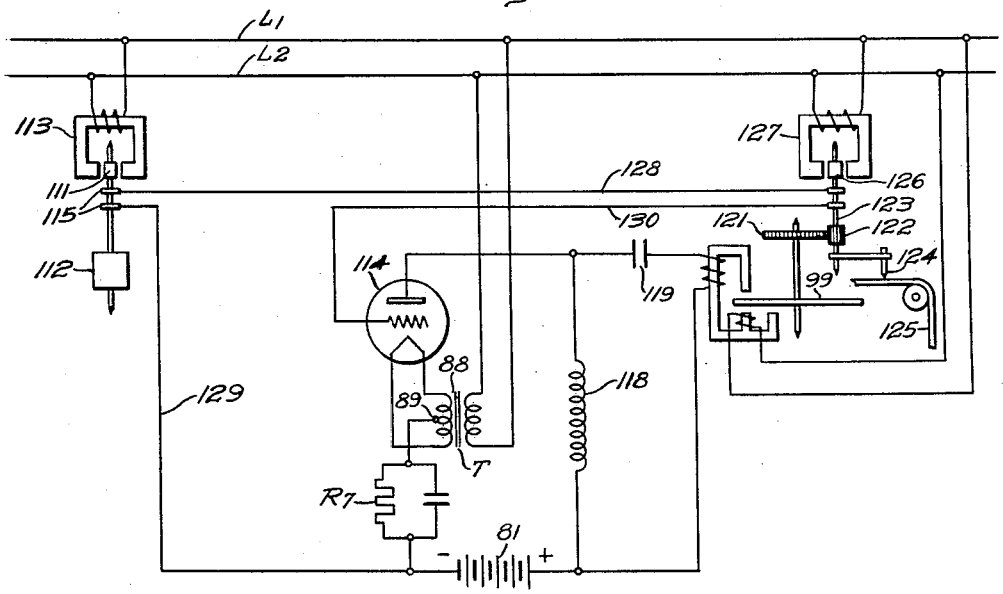
Fig. 2 is a diagrammatic view showing a recording system wherein a second pick-up coil is rotated by the pen to provide a balancing voltage which is equal and opposed to that induced in the first pick-up coil when it has been moved to the proper position.

The actuation of a recorder is shown in Fig. 2 wherein the motor disk 99 is connected through suitable gears 121, 122 to rotate a second shaft 123 and move a pen 124 over a chart 125. A second pick-up coil 126 also is mounted on the second shaft 123 of the motor. Disposed in inductive relation adjacent thereto is a field structure 127 which is excited from the A. C. line. The second pick-up coil 126 is connected in a series circuit 128, 129, 130 in opposed relation with the first pick-up coil 111, and the resulting potential which is impressed on the input of the amplifier is the difference, or algebraic sum of the two. The pick-up coils and their associated field structures may be similar so that their induced potentials will be equal and the potential impressed on the amplifier will be zero when the coils are rotated to equal angular positions.

Hence, any rotation of the first coil 111 by the meter 112 will cause the motor to run, but as the second coil 126 approaches a position which corresponds to that of the first coil the induced potentials will gradually approach equality and the motor disk 99 will gradually come to rest when the pen 124 reaches the correct position on the chart. Such arresting means is equally applicable to systems which are controlled either by electrical or non-electrical meters, and since the motor is brought to a gradual stop, the system will not overrun and hunt. Furthermore, when the galvanometer is deflected a large amount, and the difference between the voltages induced in the pick-up coils 111 and 126 is large, the motor will run at a high speed thus making the instrument quick-acting.

It is to be noted that it is not absolutely necessary to operate my system from a 110-volt 60-cycle alternating current source. The system may in fact be actuated with greater accuracy by alternating current of a higher frequency which may be supplied by a tube oscillator, or other means.

It will be understood that additional stages of amplification may be provided with suitable power tubes to supply the amount of output power required. For example, for this purpose a very satisfactory arrangement in the amplifier comprises a high mu 224 type tube the control grid of which is connected to the pick-up coil, and the plate circuit of which is coupled to the grid of a power tube, preferably of the pentode type.

Figure 3:
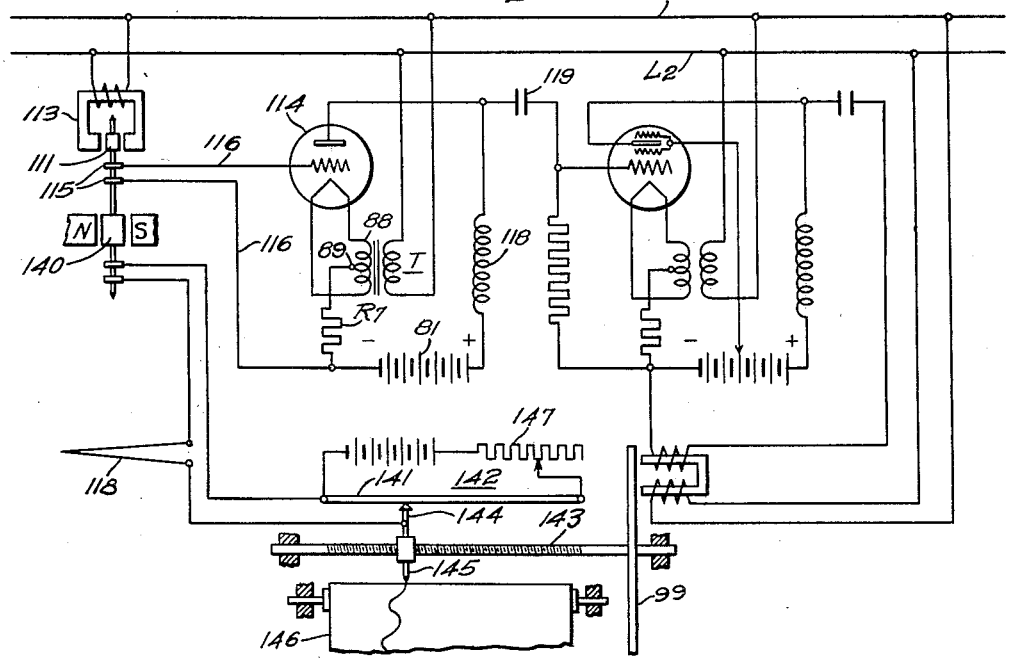
Fig. 3 is a diagrammatic view showing how a graphic recorder actuated by such a system may control a slide wire potentiometer to interpose a counterpotential in the measuring circuit of the galvanometer for balancing it back to zero when the pen has been moved to its proper position.

Referring to Fig. 3, instead of determining the position of the pen by balancing out the alternating induced voltages in the pick-up coil by voltages induced in a second pick-up coil, it is possible when the measuring meter is an electrical instrument such as a galvanometer, to balance the current in the galvanometer measuring circuit and thereby restore the galvanometer and the pick-up coil to zero position when the marker has moved to its proper position. This may be readily accomplished by so connecting the slide wire resistor 141 of a potentiometer 142 into the galvanometer input circuit in series with the thermo-couple 118 that its IR drop will oppose the measuring voltage from the thermo-couple 118 or other controlling element which influences the galvanometer 140.

In this arrangement a threaded shaft 143 is driven by a motor and adjusts the movable brush 144 of the potentiometer accordingly as it simultaneouly moves the pen 145 across the chart 146. The potentiometer is manually so adjusted by a variable resistor 147 that the counter-potential interposed in the galvanometer circuit will be equal to the potential impressed thereon by the thermocouple 118, or other controlling element, when the pen 145 has been moved to its proper position on the chart. The galvanometer 140 will then return to its zero position thereby turning the small pick-up coil 111 to its zero inductive position and stopping the motor 99.

Whenever the galvanometer turns from its zero position, potentials are induced in the pick-up coil 111 which cause the motor disk 99 to run in one direction or the other, depending upon the direction in which the pick-up coil was rotated. As the pen is moved across the chart, the potentiometer brush 144 is simultaneously moved in the same direction whereby it gradually varies the counter-potential interposed by the potentiometer in the proper direction to gradually balance out the measuring potential impressed on the galvanometer circuit by the thermocouple 118 or other measuring device. The galvanometer 140 gradually returns to its zero position and the motor disk 99 gradually comes to rest when the pen 145 has been moved to its proper position. Since the arresting means is effective to stop the motor gradually, the system will not overrun and hunt but is stable in operation.

In the use of two phase devices such as the induction disk motor or the relays utilized in my system, the maximum torque will be produced when the fluxes produced by the two sets of coils in the device are 90 degrees apart. This phase relation may be adjusted anywhere in the system by the use of condensers, inductances and resistances in the usual manner. The phase shifting apparatus may be inserted at some point in the amplifier, at the pick-up point, or even in the motor coils themselves.

I have found it possible to entirely eliminate the potentiometer with its battery and sliding brush attached to the pen and to directly balance out the current in the galvanometer circuit by feeding back the current from the circuit of the graphic recording instrument. The preferred embodiment of such a system is diagrammatically represented in Fig. 4.

The output of the first amplifier tube 114 in this system feeds into a full wave rectifier 151 through a transformer 152 one terminal of the primary winding 153 of which is connected to the plate 154 of the tube. The other terminal of the primary winding is connected to the cathode 155 through a suitable B battery 156, or source of current for the plate. The secondary winding 157 of the transformer is connected to the rectifier 151 in series relation with the secondary winding 158 of a second transformer 159 which has its primary winding connected directly to the 60 cycle A. C. line conductors L1 L2. The secondary winding of the second transformer is designed to generate about 25 volts. The movement of the galvanometer pick-up coil 111 is so limited by stops, or in any suitable manner, that in its position of maximum angular deflection the output for the secondary 157 of the first transformer 152 is about 25 volts.

The full wave rectifier 151 may be made up of copper oxide elements and its direct current output is applied to the grid and cathode of a second vacuum tube 164 which may be a 245 power tube. A resistor R8 of about 1 megohm is inserted in the grid connection and a condenser 165 of about 4 mfd. capacity is connected between the grid and the cathode of the tube. A resistor R9 is shunted across the output terminals of the rectifier, and may have a resistance of about 50,000 ohms. A circuit extends from the plate of the tube 164 through a resistor R10 and suitable B battery 166 or other source of current to the cathode. The B source is shunted by resistors R11 and R12, and from the intermediate point C connection is made with conductor 167 of the output circuit. The other side of the output circuit comprises a conductor 168 which joins the plate circuit at a point D between the plate and the resistor R10. Said output conductors are connected to a direct current type graphic recorder 171 through a resistor R13. The resistor R13 is included in the galvanometer input circuit in series with the thermocouple 118 or other measuring device.

A specific operation of the system may be traced as follows. Assume the temperature difference between the two ends of the thermo-couple 118 to be sufficient to generate .015 volts, and also that the resistor R13 in series with the couple has a resistance of 10 ohms. To balance the .015 volts generated by the couple, a current of .0015 amperes must flow through the resistor R13. Suppose for a moment that the voltage across the 4 mfd. condenser 165, and on the grid of the associated tube 164, is such a value as to allow a current of the correct value of .0015 amperes to flow through the 10 ohm resistor R13. Under these conditions the galvanometer will be balanced and the pick-up coil will be at its zero position. But when the pick-up coil is at zero, the input to the rectifier is 25 volts. With this input the D. C. output voltage from the rectifier across the 4 mfd. condenser 165 will start to decrease, and if allowed to continue the current through the milliameter and the resistor R13 would finally become zero. The value of the resistors R10, R11 and R12 associated with the last tube is adjusted to make this possible. The moment the current through the 10 ohm resistor R13 drops slightly below .0015 amperes, the voltage across this resistor no longer balances the voltage generated by the thermo-couple 118.

Because of the above condition of unbalanced voltages, the galvanometer 140 and also the pick-up coil 111 changes the input to the rectifier, which causes the current through the resistor R13 to slowly (because of the time delay caused by the condenser 165 being charged in series with the 1 megohm resistor R8) increase to a value slightly above the correct value of .0015 amperes, which again unbalances the galvanometer and pick-up coil, but this time the unbalance is in such a direction as to bring the current slightly below the correct value of .0015 amperes.

At all times, except when the thermo-couple 118 is generating zero voltage, the galvanometer 140 is oscillating a small amount and also the current through the resistor R13 and the recording milliammeter 171 is varying slightly above and below the value necessary to balance the voltage of the couple. The varying current moves the milliammeter only slightly, probably less than the width of a mark made by the pen 124, because of the greater sensitivity of the galvanometer over the milliammeter.

In Fig. 5 I have shown an amplifier suitable for use in the above systems and a power supply whereby the amlpifier may be energized directly from the 110 volt 60 cycle A. C. mains. As in the systems disclosed above, a field structure 113 is excited directly from the line conductors L1 L2 and has associated therewith a pick-up coil 111 which may be mounted on the rotatable element of a galvanometer, a pressure gauge, or a meter responsive to any condition to be observed or regulated. The output from the pick-up coil is impressed upon the first tube 181 of the amplifier which is preferably a 227 high mu tube. One terminal of the coil 111 is connected directly to the grid of the tube 181 through a conductor 182 and the other terminal is connected to the cathode through a conductor 183 and a pair of resistors R15 and R16 of 100,000 and 750 ohms resistance respectively connected in series and shunted by a condenser 184 of about .25 mfd. capacity.

The output or plate circuit of the first tube 181 extends by a conductor 186 through a coupling impedance 187 of about 200 henries and a resistor R17 of about 20,000 ohms. The plate end of the circuit is coupled from the conductor 186 to the grid of the second tube 191 through a condenser 192 of about .1 mfd. capacity. The second tube 191 is preferably a 247 tube and its filament is shunted by a resistor R18 of 10 ohms which is center tapped to provide a constant potential point E for connection with the grid return circuit and the cathode of the first tube 181. An interconnecting conductor 193 extends from the center tap E of the shunting resistor R18 through a biasing resistor R19 to a point F between the two resistors R15 and R16 associated with the cathode of the first tube 181. The grid of the second tube 191 is connected to the cathode circuit conductor 193 through a resistor R21 of about 100,000 ohms resistance. The plate or output circuit of the second tube extends by way of a conductor 194 through one coil 195 of a two phase device to be actuated thereby, thence to the screen grid of the second tube and the plate circuit of the first tube by way of a conductor 196.

A power transformer 201 is directly energized from the A. C. line conductors L1 L2 and a plurality of secondary windings S1, S2 and S3 afford suitable voltages for energizing various elements of the amplifier. One low voltage secondary winding S1 is connected by suitable conductors 202, 203 directly to the filaments of the two amplifier tubes 181, 191 which are connected in parallel by suitable conductors 204, 205 whereby both are energized by alternating current of a proper voltage.

In order that suitable direct current may be supplied to the plates of the amplifier tubes a full wave tube 206 such as the type 280 is provided and its filament is energized by alternating current of a proper voltage supplied by a suitable secondary winding S2 on the power transformer. A center tapped high voltage secondary winding S3 has its terminals connected to the respective plates of the rectifier tube 206, and a conductor 207 extends from the center tap G to the interconnected cathode conductor 193 of the amplifier tubes. From the filament of the rectifier tube a circuit extends to the plate circuits of the amplifier tubes through a conductor 208, a resistor R22 of about 1000 ohms, an impedance coil 209 of about 20 henries inductance, and a conductor 210 which joins the conductor 196. Large filter condensers 212 and 213 of about 8 mfd. capacity each are connected between the transformer center tap conductor 207 and the respective terminals of the impedance coil 209.

The coil of the actuated device in the plate circuit of the last amplifier tube is shunted by a condenser 214 of .5 capacity. The other coil 215 of the controlled device is connected directly to the main A. C. line conductors L1 L2 through a circuit comprising conductors 216 and 217, having a resistor R23 of about 75 ohms in series therewith to obtain the most effective phase relation between the currents in the two coils 195 and 215 for maximum torque.

The measuring device on which the pick-up coil 111 is mounted rotates the latter in one direction or the other in accordance with variations of the influencing condition. As the voltages induced in the pick-up coil 111 are impressed on the amplifier they are amplified in magnitude and excite the coil of the controlled device which is connected in the plate circuit of the last amplifier tube. The device is thus actuated in a direction which is determined by the relative phase relation of the alternating currents in the two windings of the device and at a speed which is determined by the magnitude of the A. C. voltages induced in the pick-up coil, both of which depend upon the direction and degree of rotation of the latter.

Although I have shown separate sources of current for each plate and filament in the amplifiers of many of the above systems and have represented them as batteries, this has been done merely to simplify the diagrams and it is to be understood that these circuits may be energized from a B-battery eliminator as shown above in Fig. 5 or in any suitable manner.

It will be seen, therefore, that I have provided an electronic system utilizing various space effects wherein a delicate measuring instrument may control a graphic recorder or regulating means in accordance with certain variable conditions or quantities, that the speed and direction of operation of the system will correspond to the variation of the controlling quantity or condition, that the system will be stable and anti-hunting in its operation and is simple and economical in its arrangement with a minimum of moving parts and contacts.

Although I have shown and described certain specific embodiments of my invention, in compliance with the statutes, such embodiments are disclosed merely as specific examples of some of the systems wherein my invention may be applied, and I do not wish to be restricted to the specific structural details, or the specific circuit connections, voltages, frequencies, inductance, capacities and resistances therein set forth since various other modifications thereof may be effected without departing from the spirit of my invention. My invention, therefore, is not to be limited except as necessitated by the prior art and the scope of the appended claims.

I claim as my invention:

1. In combination means for deriving from an original source of alternating voltage an additional alternating voltage variable in instantaneous polarity and amplitude according to a controlling quantity or condition comprising means energized from said original source of alternating voltage for setting up an alternating field, a pick-up coil disposed in said field, means for rotating said coil to vary its inductive relation to the field accordingly as said quantity or condition varies.

2. In combination means for deriving from an original source of alternating voltage an additional alternating voltage variable in instantaneous polarity and amplitude according to a controlling quantity or condition comprising means energized from said original source of alternating voltage for setting up an alternating field, a pick-up coil disposed in said field, means for rotating said coil to zero inductive position or either direction therefrom accordingly as said quantity or condition varies, and means responsive to the simultaneous effects of said derived and original voltages.

3. In combination means for deriving from an original source of alternating voltage an additional alternating voltage variable in instantaneous polarity and amplitude according to a variable condition or quantity, responsive means energized by said derived alternating voltage for actuation thereby, and arresting means for interrupting the actuation of said responsive means when its actuation is proportional to said quantity or condition.

4. The combination set forth in claim 3 wherein the "arresting means" comprises means for introducing an equal and opposing voltage in series with the derived voltage.

5. The combination set forth in claim 3 wherein the "arresting means" comprises means for reducing the derived voltage to zero.

6. In combination means for deriving from an original source of alternating voltage an additional alternating voltage variable in instantaneous polarity and amplitude according to a controlling quantity or condition comprising means energized from said original source of alternating voltage for setting up an alternating field, a pick-up coil disposed in said field, means for rotating said coil to zero inductive position or either direction therefrom accordingly as said quantity or condition varies, and means responsive to the simultaneous effects of said derived and original voltages, a second pick-up coil disposed in a field set up by said original source of alternating voltage, a circuit including said responsive means in series with said pick-up coils in opposing relation, and means associating said second pick-up coil with said responsive means whereby the actuation of the latter will vary the inductive relation of the coil in the field to set up a balancing counter voltage when the actuation has been proportional to said controlling quantity or condition.

7. In combination means for deriving from an original source of alternating voltage an additional alternating voltage variable in instantaneous polarity and amplitude according to a variable quantity or condition comprising, means energized from said original source of alternating voltage for setting up an alternating field, a pick-up coil disposed in said field, a galvanometer responsive to said quantity or condition, means for supporting said pick-up coil on said galvanometer whereby the inductive relation of the coil to the field is varied in accordance with the actuation of the galvanometer, an electro-responsive device actuated by the simultaneous effect of the voltages induced in said pick-up coil and said original voltage, a second pick-up coil actuated by the electro-responsive device in inductive relation to a field set up by the original voltage source, and means for connecting the electro-responsive device in series with said coils in opposing relation whereby the actuation of said electro-responsive device causes the second coil to induce an opposing alternating voltage which balances the voltage induced in the first pick-up coil when the device has been actuated an amount proportional to the amount the galvanometer has been actuated by said variable quantity or condition.

8. In combination a direct current type electro-responsive device, means for energizing said device by direct current variable in accordance with some quantity or condition, responsive means set into operation thereby, arresting means for interrupting the operation of said responsive means when its actuation is proportional to the variation of said quantity or condition comprising means for introducing a counter voltage in the energizing current circuit.

9. In combination an electro-responsive device energized by a measuring current variable in accordance with some quantity or condition, a graphic recorder comprising a motor and a marker driven thereby, means controlled by said electro-responsive device for running said motor in accordance with variations of said condition or quantity, arresting means for interrupting the operation of said motor when the actuation of said marker is proportional to said variation comprising a potentiometer driven by the motor for introducing an opposing voltage in the measuring current circuit.

10. In combination means for deriving from an original source of alternating voltage an additional voltage variable in instantaneous polarity and amplitude relative thereto, means for controlling said voltage deriving means comprising an electro-responsive device energized by a measuring current variable in accordance with some quantity or condition, responsive means actuated by the simultaneous effect of said original and said derived voltages, arresting means for interrupting the actuation of said responsive means when its actuation is proportional to the variation of said condition or quantity comprising means driven by the responsive means for introducing a counter potential into the measuring current circuit to restore the device and the associated voltage deriving means to zero position.

11. In combination means for deriving from an original source of alternating voltage an additional voltage variable in instantaneous polarity and amplitude in accordance with a variable quantity or condition comprising means energized by said original voltage source for setting up an alternating field, a pick-up coil disposed in inductive relation to said field, means for varying the inductive relation of said coil in said field in accordance with variations of said quantity or condition, an amplifier, means connecting said pick-up coil to the input of said amplifier, a two-phase device, and means connecting one phase of the device to the output of the amplifier and the other phase to the original source of alternating voltage.

12. In combination means for deriving from an original source of alternating voltage an additional voltage variable in instantaneous polarity and amplitude in accordance with a variable quantity or condition comprising means energized by said original source of alternating voltage for setting up an alternating field, a pick-up coil disposed in inductive relation to said field, means for varying the inductive relation of said coil in said field in accordance with variations of said quantity or condition, an amplifier comprising a high mu amplifier tube, a grid controlled rectifier tube, means for energizing the plate of said rectifier tube from said original source of alternating voltage, a power output tube suitably coupled thereto, and a graphic milliammeter in the plate circuit of the last tube.

HENRY L. BERNARDE.